(12) United States Patent
Ando (10) Patent No.: US 11,383,391 B2
(45) Date of Patent: Jul. 12, 2022

(54) GRIPPING MECHANISM AND ASSEMBLY APPARATUS

(71) Applicant: KYOCERA Document Solutions Inc., Osaka (JP)

(72) Inventor: Satoshi Ando, Osaka (JP)

(73) Assignee: KYOCERA Document Solutions Inc., Osaka (JP)

(\*) Notice: Subject to any disclaimer, the term of this patent is extended or adjusted under 35 U.S.C. 154(b) by 163 days.

(21) Appl. No.: 16/905,777

(22) Filed: Jun. 18, 2020

(65) Prior Publication Data

US 2020/0398439 A1 Dec. 24, 2020

(30) Foreign Application Priority Data

Jun. 20, 2019 (JP) ............................. JP2019-114673

(51) Int. Cl.
*B25J 15/00* (2006.01)

(52) U.S. Cl.
CPC ....... *B25J 15/0038* (2013.01); *B25J 15/0052* (2013.01)

(58) Field of Classification Search
CPC ..... B25J 15/0038; B25J 15/0052; B66C 1/38; B66C 1/442; B66C 1/48
USPC .................................... 248/316.3; 294/102.1
See application file for complete search history.

(56) References Cited

U.S. PATENT DOCUMENTS

| 1,417,009 | A | * | 5/1922 | Woodward | ............ | A47G 25/487 |
| | | | | | | 223/91 |
| 3,675,782 | A | * | 7/1972 | Dudley | ................. | B42F 15/066 |
| | | | | | | 211/50 |
| 3,780,923 | A | * | 12/1973 | Merola | ................. | B25B 1/2473 |
| | | | | | | 226/151 |
| 7,373,748 | B2 | * | 5/2008 | Pitcher | ...................... | G09F 7/00 |
| | | | | | | 24/462 |
| 2020/0009744 | A1 | * | 1/2020 | Bloch | ........................ | B25J 9/04 |
| 2020/0164524 | A1 | * | 5/2020 | Yamakawa | .......... | B25J 15/0038 |
| 2020/0269442 | A1 | * | 8/2020 | Izumi | .................. | B25J 15/0028 |
| 2020/0377310 | A1 | * | 12/2020 | Yamakawa | ............ | B65G 47/90 |
| 2020/0398439 | A1 | * | 12/2020 | Ando | .................. | B25J 15/0052 |
| 2022/0024053 | A1 | * | 1/2022 | Yamakawa | .......... | B25J 15/0038 |

FOREIGN PATENT DOCUMENTS

JP H07-241733 A 9/1995

\* cited by examiner

*Primary Examiner* — Saul Rodriguez
*Assistant Examiner* — Brendan P Tighe
(74) *Attorney, Agent, or Firm* — Studebaker & Brackett PC (57) ABSTRACT

A gripping mechanism which grips an object includes a main body section, a first gripping section, and a second gripping section. The first and second gripping sections are connected, with a space therebetween, to the main body section. The first gripping section includes a first roller and a first frame. The first frame houses the first roller. The first gripping section grips a first portion of an object between an outer surface of the first roller and an inner surface of the first frame using gravity acting on the first roller. The second gripping section includes a second roller and a second frame. The second frame houses the second roller. The second gripping section grips a second portion of the object, differing from the first portion, between an outer surface of the second roller and an inner surface of the second frame using gravity acting on the second roller.

5 Claims, 8 Drawing Sheets

GRIPPING MECHANISM AND ASSEMBLY APPARATUS

INCORPORATION BY REFERENCE

The present application claims priority under 35 U.S.C. § 119 to Japanese Patent Application No. 2019-114673, filed on Jun. 20, 2019. The contents of this application are incorporated herein by reference in their entirety.

BACKGROUND

The present disclosure relates to a gripping mechanism and an assembly apparatus.

A known assembly apparatus includes a chuck mechanism which grips a component to be conveyed. The chuck mechanism is an electric gripping mechanism. Other gripping mechanisms are known which use air suction or electric suction.

SUMMARY

A gripping mechanism according to an aspect of the present disclosure grips an object. The gripping mechanism includes a main body section, a first gripping section, and a second gripping section. The first gripping section and the second gripping section are connected to the main body section with a space between the first gripping section and the second gripping section. The first gripping section includes a first roller and a first frame. The first frame houses the first roller. The first gripping section grips a first portion of the object between an outer surface of the first roller and an inner surface of the first frame using gravity acting on the first roller. The second gripping section includes a second roller and a second frame. The second frame houses the second roller. The second gripping section grips a second portion of the object between an outer surface of the second roller and an inner surface of the second frame using gravity acting on the second roller. The second portion differs from the first portion.

An assembly apparatus according to an aspect of the present disclosure includes the above gripping mechanism and a driving mechanism which moves the gripping mechanism relative to the object.

DETAILED DESCRIPTION

Figure 1:
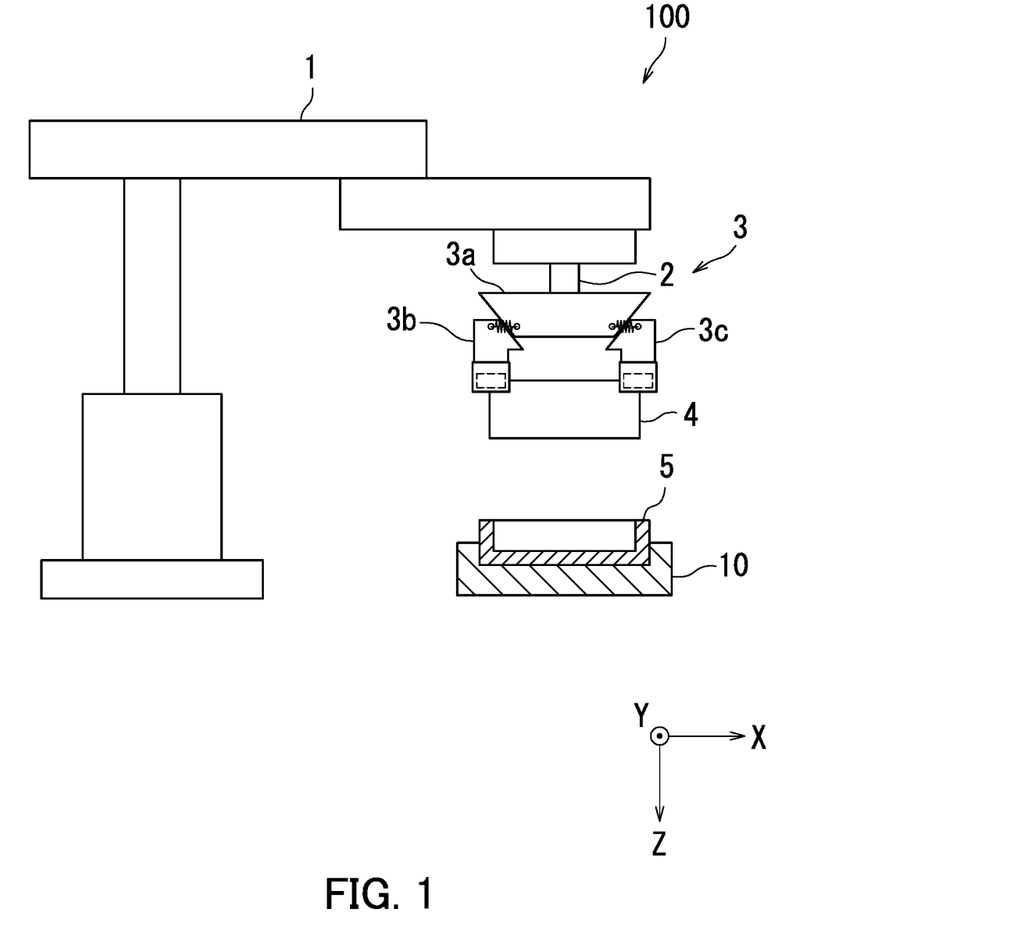
FIG. 1 is a diagram illustrating an example of an assembly apparatus according to an embodiment of the present disclosure.
Figure 2:
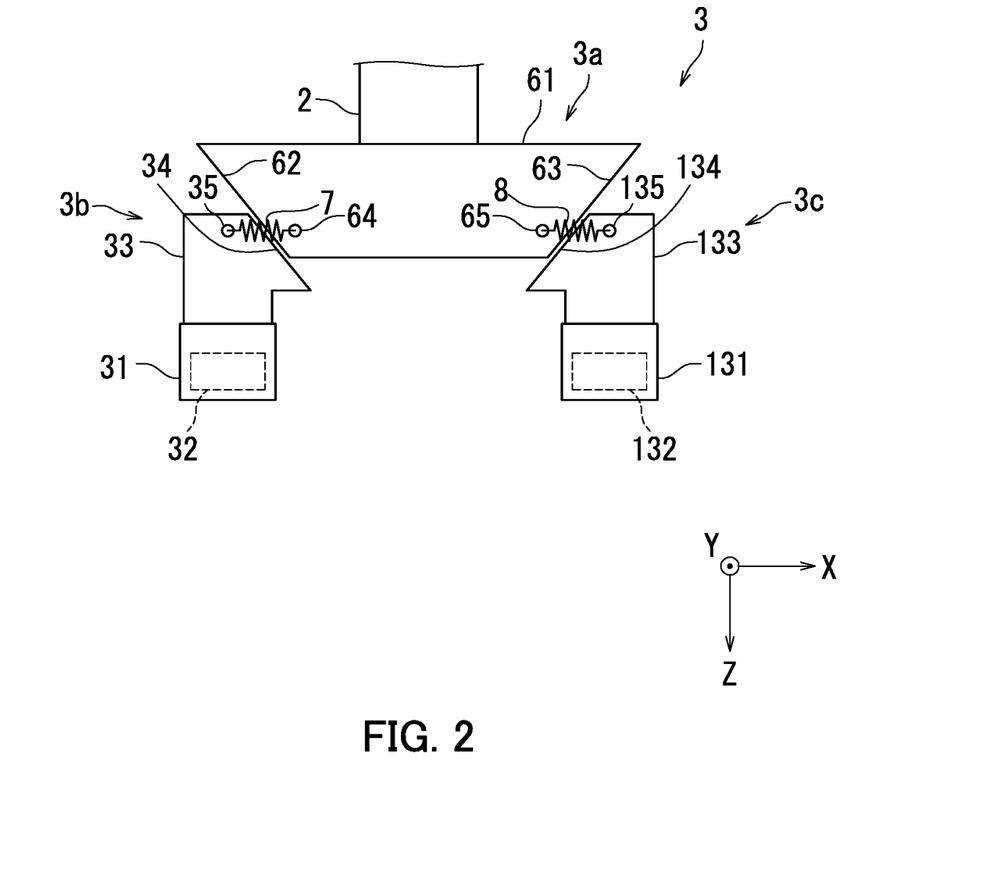
FIG. 2 is a front view of an example of a gripping mechanism.
Figure 3:
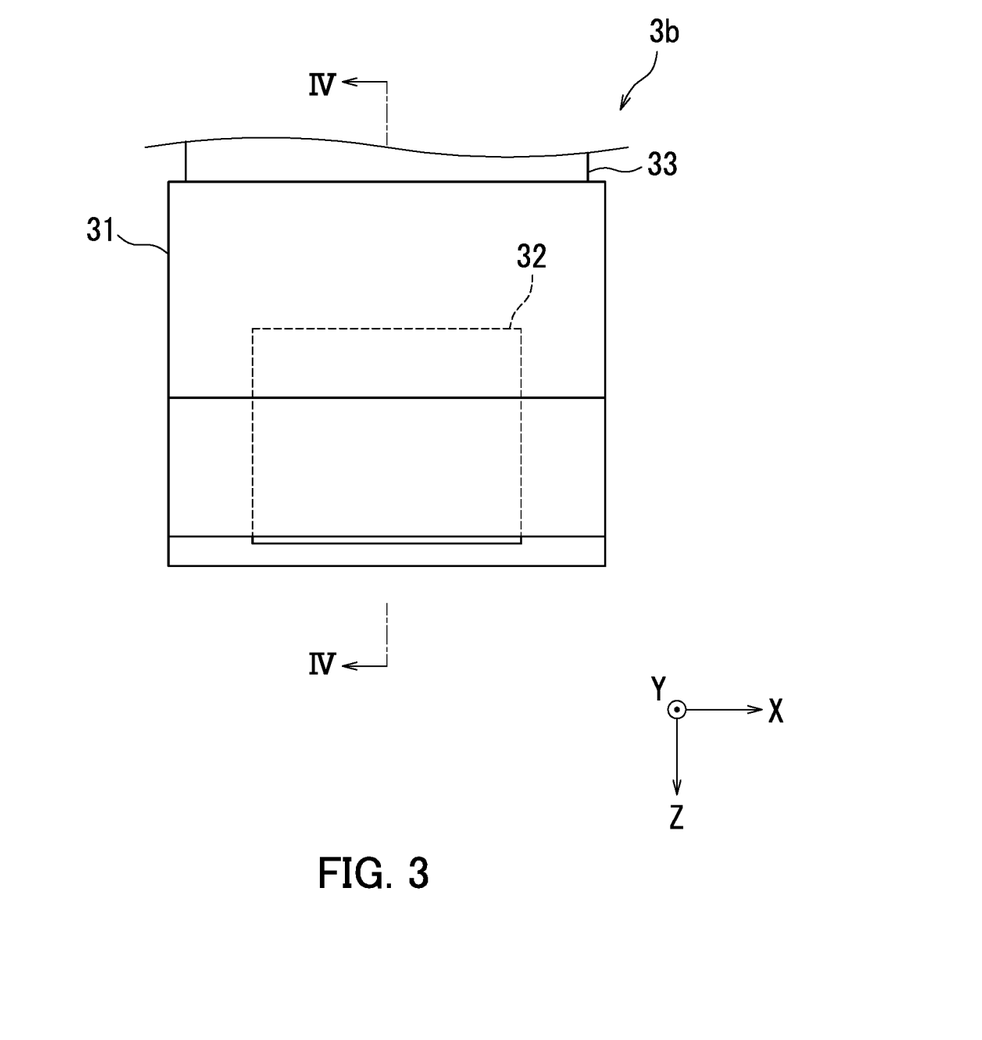
FIG. 3 is an enlarged front view of a first gripping section.

The following describes an embodiment of the present disclosure with reference to FIGS. 1 to 8. In FIGS. 1 to 3, as a matter of convenience, a direction from the left to the right is referred to as a positive X axial direction, a direction from the back to the front is referred to as a positive Y axial direction, and a direction from up to down is referred to as a positive Z axial direction. Elements which are the same or equivalent are labeled with the same reference signs in the drawings and description thereof is not repeated.

First, an assembly apparatus 100 according to the embodiment is described with reference to FIG. 1. FIG. 1 is a diagram illustrating an example of the assembly apparatus 100.

As illustrated in FIG. 1, the assembly apparatus 100 is an apparatus which assembles by fitting a first component 4 to a second component 5. The first component 4 is rectangular plate-shaped. The assembly apparatus 100 includes a robot 1, a position correcting device 2, and a gripping mechanism 3. The robot 1 is equivalent to an example of a "driving mechanism".

The gripping mechanism 3 grips the first component 4. The gripping mechanism 3 includes a main body section 3a, a first gripping section 3b, and a second gripping section 3c. The first gripping section 3b and the second gripping section 3c are connected to the main body section 3a with a space between the first gripping section 3b and the second gripping section 3c. The first gripping section 3b grips one corner of the upper end of the first component 4. The second gripping section 3c grips the other corner of the upper end of the first component 4. The second component 5 is positioned on a position determining mechanism 10.

The position correcting device 2 corrects, relative to the second component 5, positional shift of the first component 4 gripped by the gripping mechanism 3.

Specifically, the position correcting device 2 detects the direction of motive force of the first component 4 during fitting of the first component 4 to the second component 5 and corrects a positional shift of the first component 4 according to the direction of the force.

The robot 1 moves the gripping mechanism 3 relative to the first component 4 and also moves the gripping mechanism 3 relative to the second component 5. Specifically, the robot 1 moves the gripping mechanism 3 to a storage location of the first component 4, grips the first component 4 with the gripping mechanism 3, and then moves the first component 4 together with the gripping mechanism 3 to a point directly above the second component 5. Thereafter, the robot 1 fits the first component 4 to the second component 5 by moving the first component 4 together with the gripping mechanism 3 in the positive Z axial direction. After the fitting has been achieved, the robot 1 causes the gripping mechanism 3 to release the first component 4 and moves the gripping mechanism 3 in the negative Z axial direction.

Next, an overall configuration of the gripping mechanism 3 is described with reference to FIG. 2. FIG. 2 is a front view of an example of the gripping mechanism 3.

As illustrated in FIG. 2, the first gripping section 3b includes a first holder 31, a first gripping roller 32, and a first sliding section 33. The first holder 31 houses the first gripping roller 32. The first holder 31 is equivalent to an example of a "first frame". The first gripping roller 32 is equivalent to an example of a "first roller".

The first sliding section 33 is formed as a plate fixed to an end surface of the first holder 31 in the negative Z axial direction. Two main surfaces of the first sliding section 33 are parallel to the ZX plane. The first sliding section 33 has a first slanted end portion 34 and a first hole portion 35. The first slanted end portion 34 is slanted at an approximate 45-degree angle to the positive Z axial direction in the positive X axial direction.

The second gripping section 3c has a second holder 131, a second gripping roller 132, and a second sliding section 133. The second holder 131 houses the second gripping roller 132. The second holder 131 is equivalent to an example of a "second frame". The second gripping roller 132 is equivalent to an example of a "second roller".

The second sliding section 133 is formed as a plate fixed to an end surface of the second holder 131 in the negative Z axial direction. Two main surfaces of the second sliding section 133 are parallel to the ZX plane. The second sliding section 133 has a second slanted end portion 134 and a second hole portion 135. The second slanted end portion 134 is slanted at an approximate 45-degree angle to the positive Z axial direction in the negative X axial direction.

The main body section 3a includes a housing 61 connected to the position correcting device 2. The housing 61 includes a third slanted end portion 62, a fourth slanted end portion 63, a third hole portion 64, and a fourth hole portion 65.

The third slanted end portion 62 is slanted in an approximate 45-degree angle to the positive Z axial direction in the positive X axial direction. The first slanted end portion 34 of the first gripping section 3b is slidably connected to the third slanted end portion 62 of the main body section 3a. The fourth slanted end portion 63 is slanted in an approximate 45-degree angle to the positive Z axial direction in the negative X axial direction. The second slanted end portion 134 of the second gripping section 3c is slidably connected to the fourth slanted end portion 63 of the main body section 3a.

The gripping mechanism 3 further includes a first spring 7 and a second spring 8. The first spring 7 connects the first sliding section 33 to the main body section 3a, and the second spring 8 connects the second sliding section 133 to the main body section 3a. Specifically, one end of the first spring 7 is fixed to the first hole portion 35, and the other end of the first spring 7 is fixed to the third hole portion 64. One end of the second spring 8 is fixed to the second hole portion 135, and the other end of the second spring 8 is fixed to the fourth hole portion 65. The first spring 7 is equivalent to an example of a "first elastic member". The second spring 8 is equivalent to an example of a "second elastic member".

Figure 4:
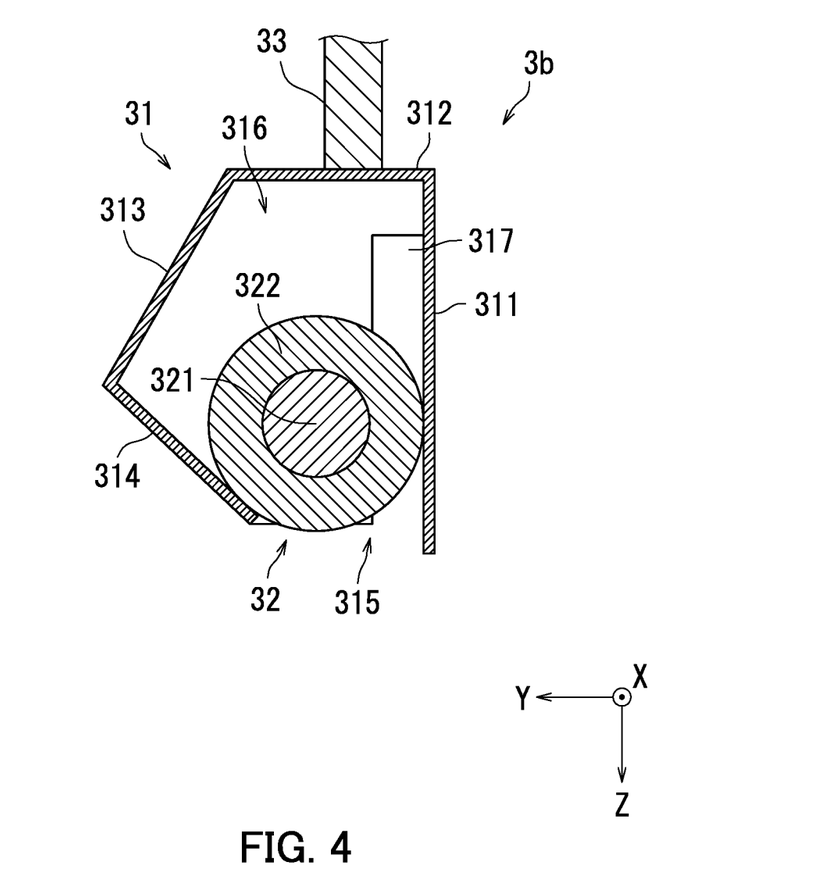
FIG. 4 is a cross-sectional view taken along a line IV-IV in FIG. 3.

Next, a detailed configuration of the first gripping section 3b is described with reference to FIGS. 3 and 4. FIG. 3 is an enlarged front view of the first gripping section 3b. FIG. 4 is a cross-sectional view taken along a line IV-IV in FIG. 3. Note that because the second gripping section 3c is the same as the first gripping section 3b, description of the detailed configuration of the second gripping section 3c is omitted.

As illustrated in FIGS. 3 and 4, the first gripping roller 32 includes a cylindrical core 321 and a covering section 322 which covers the peripheral surface of the core 321. For example, the core 321 is made from a metal such as iron, and the covering section 322 is made from an elastic object such as polyacetal resin. The density of the core 321 is greater than the density of the covering section 322. The covering section 322 can be compressed and deformed. The friction coefficient of the peripheral surface of the covering section 322 is greater than the friction coefficient of the peripheral surface of the core 321.

The first holder 31 includes a back plate 311, a top plate 312, an upper front plate 313, a lower front plate 314, and left and right side plates 316. The first holder 31 is made from a light metal such as aluminum, for example.

The back plate 311 is a rectangular plate extending along a ZX plane. The top plate 312 is a rectangular plate extending along a XY plane starting from an upper edge of the back plate 311. The upper front plate 313 is a rectangular plate extending diagonally downward in a direction away from the back plate 311 starting from the front edge of the top plate 312. The lower front plate 314 is a rectangular plate extending diagonally downward in a direction approaching the back plate 311 starting from the lower edge of the upper front plate 313.

An opening 315 is formed between the back plate 311 and the lower front plate 314. The width of the opening 315 in the Y axial direction is shorter than the diameter of the first gripping roller 32. Accordingly, the first gripping roller 32 does not fall through the opening 315. The back plate 311 and the lower front plate 314 support the weight of the first gripping roller 32. The lower front plate 314 is slanted relative to the Z axial direction (vertical direction). The opening 315 can receive insertion of an object to be gripped.

The back plate 311, the top plate 312, the upper front plate 313, and the lower front plate 314 form substantially pentagonal openings in the left and right side surfaces of the first holder 31. The left and right side plates 316 are located so as to cover the openings. However, at least one of the side plates 316 has a cutout 317 which allows passage of the object to be gripped but not passage of the first gripping roller 32 when gripping is released. The cutout 317 is positioned near the back plate 311.

By configuring a side plate 316 to be freely openable and closable for example, it is possible to insert and remove the first gripping roller 32.

Figure 5:
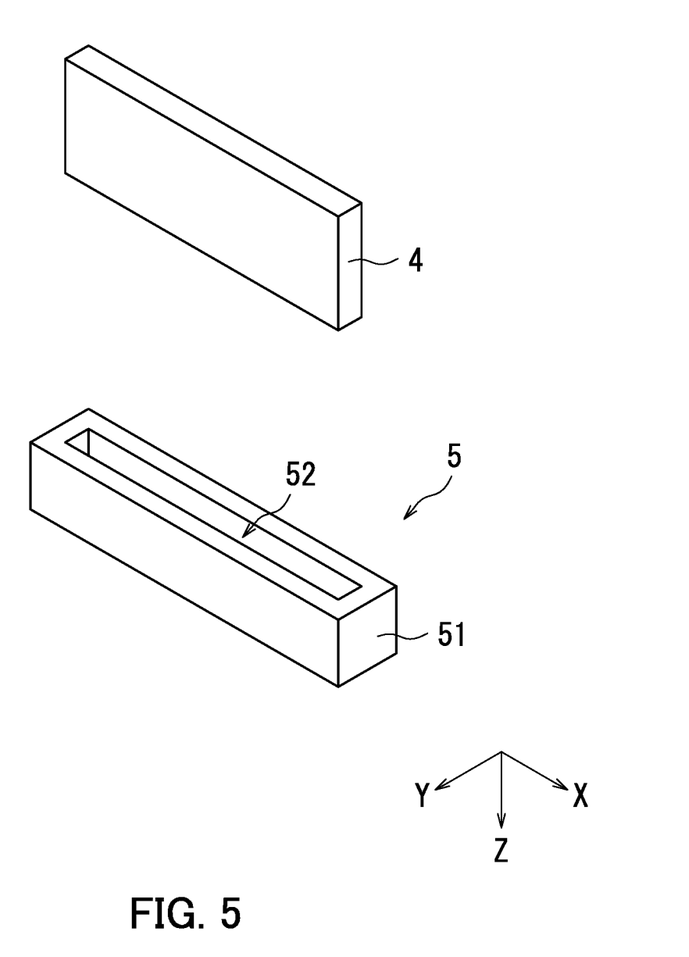
FIG. 5 is a perspective view of an example of a first component and a second component.

Next, the first component 4 and the second component 5 are described with reference to FIG. 5. FIG. 5 is a perspective view of an example of the first component 4 and the second component 5.

As illustrated in FIG. 5, the first component 4 is a rectangular plate extending along the ZX plane. The second component 5 is formed with a recess 52 in a substantially rectangular parallelepiped-shaped component main body 51. The recess 52 receives insertion of the lower end of the first component 4.

Figure 6:
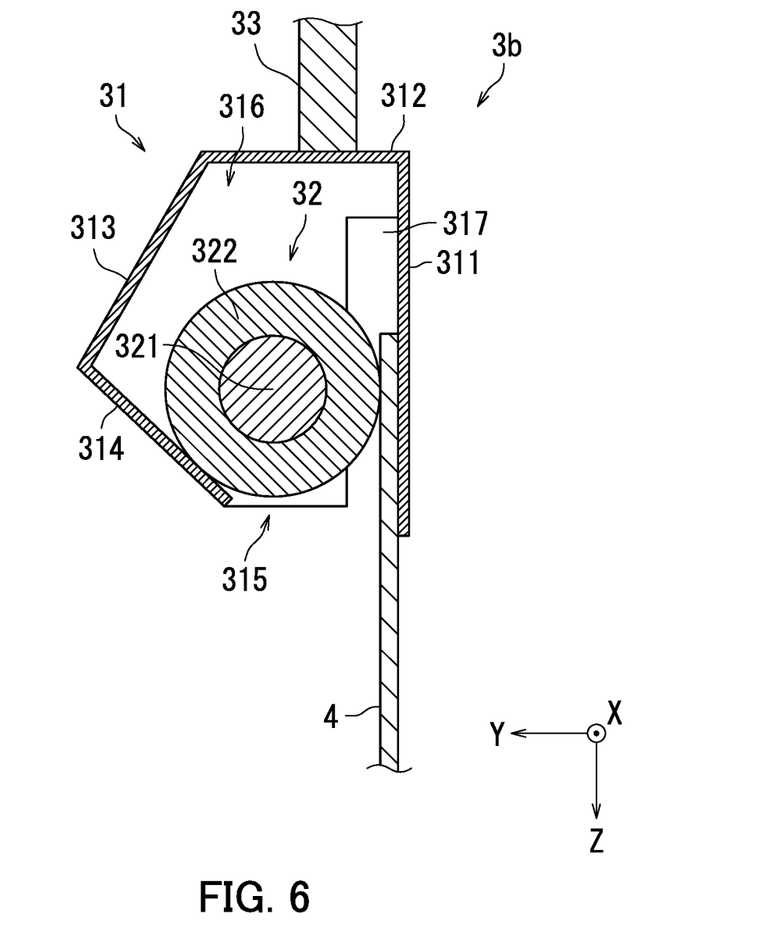
FIG. 6 is a cross-sectional view for describing operation of the first gripping section.

Next, operation of the first gripping section 3b is described with reference to FIG. 6. FIG. 6 is a cross-sectional view for describing the operation of the first gripping section 3b.

As illustrated in FIG. 6, the first gripping section 3b grips one corner of the upper end of the first component 4 between the outer surface of the first gripping roller 32 and the inner surface of the first holder 31 using gravity acting on the first gripping roller 32. Specifically, the first component 4 is gripped by suitable frictional force between the outer surface of the covering section 322 and the inner surface of the back plate 311. Through the covering section 322 compressively deforming, great gripping force is realized due to the covering section 322 having a larger surface area of contact with the first component 4 than in a case where the covering section 322 is made from an inelastic material.

Though omitted from the drawings, the second gripping section 3c grips the other corner of the upper end of the first component 4 between the outer surface of the second gripping roller 132 and the inner surface of the second holder 131 using gravity acting on the second gripping roller 132.

Figure 7:
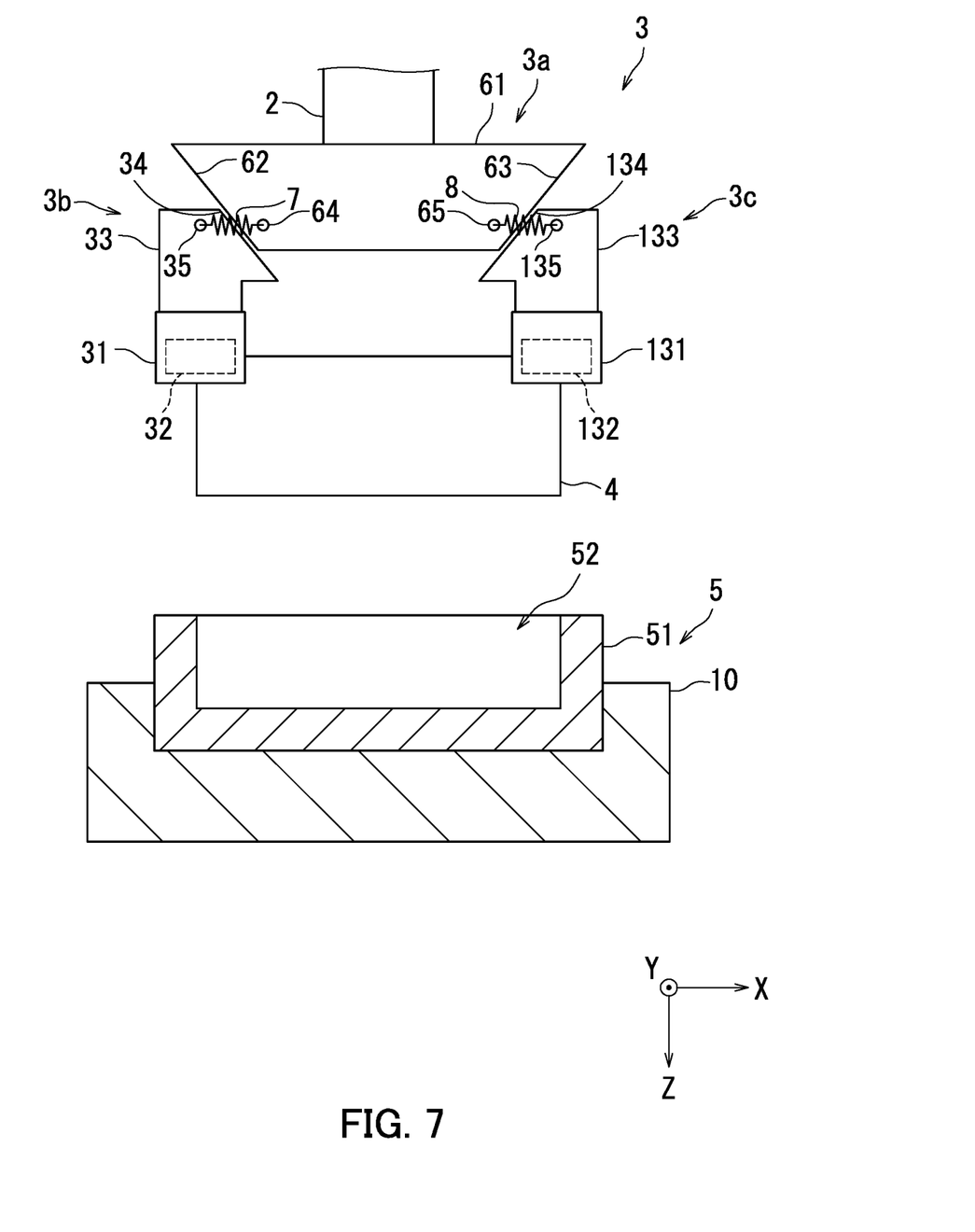
FIG. 7 is a front view for describing operation of the assembly apparatus.
Figure 8:
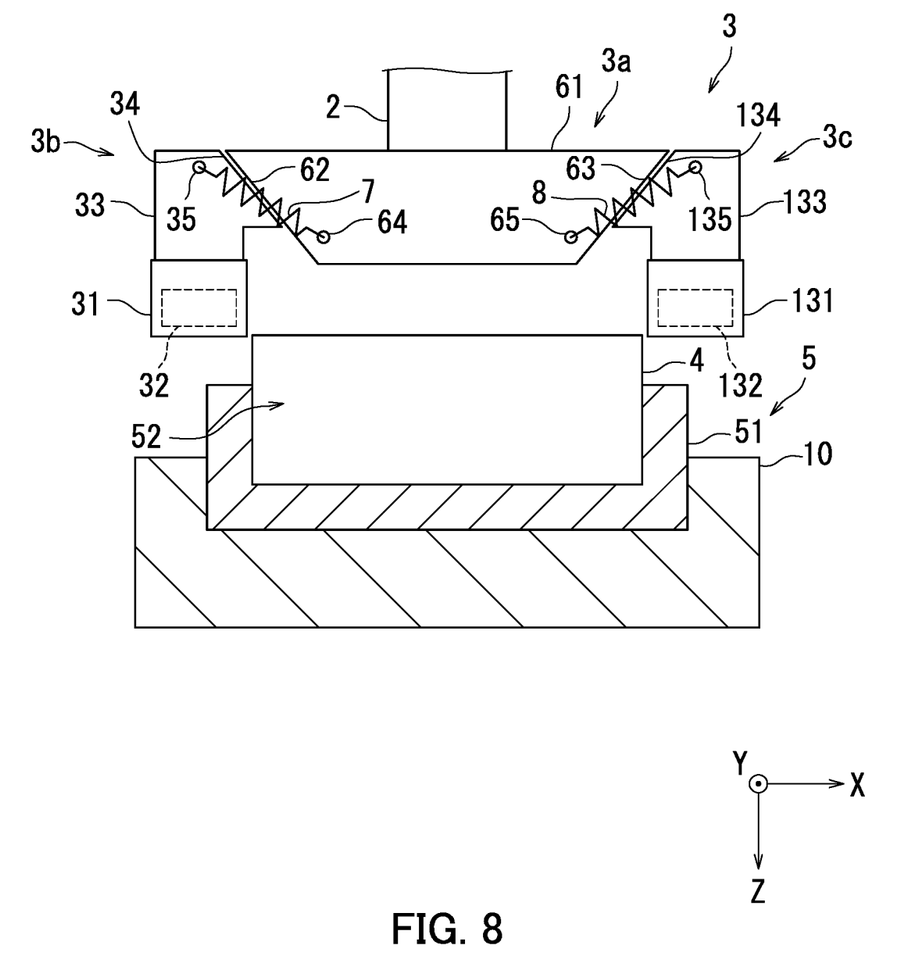
FIG. 8 is another front view for describing operation of the assembly apparatus.

The following describes operation of the assembly apparatus 100 with reference to FIGS. 1 to 8. FIGS. 7 and 8 are front views for describing the operation of the assembly apparatus 100.

In a first process, the robot 1 moves the gripping mechanism 3 to the storage location of the first component 4. Upon adjusting the posture of the gripping mechanism 3, the robot 1 then moves the gripping mechanism 3 in the positive Z axial direction relative to the first component 4. The upper end of the first component 4 enters the first holder 31 and rises within the first holder 31 while pushing aside the first gripping roller 32. At the same time, the upper end of the first component 4 enters the second holder 131 and rises within the second holder 131 while pushing aside the second gripping roller 132. When the upper end of the first component 4 reaches a position higher than both the center of the first gripping roller 32 and the center of the second gripping roller 132, the movement of the gripping mechanism 3 stops. As a result, the gripped state illustrated in FIG. 6 is realized.

In a second process, upon moving the gripping mechanism 3 in the negative Z axial direction, the robot 1 conveys the first component 4 to a point directly above the second component 5 as illustrated in FIG. 7 by further moving the gripping mechanism 3. The first component 4 remains gripped by the first gripping section 3b and the second gripping section 3c.

In a third process, the robot 1 moves the gripping mechanism 3 in the positive Z axial direction. As a result, the first component 4 is fitted to the second component 5. The gripped state illustrated in FIG. 6 is maintained at least until just before fitting.

In a fourth process, the robot 1 further moves the gripping mechanism 3 in the positive Z axial direction. As a result, force in the negative Z axial direction acts on both of the first gripping section 3b and the second gripping section 3c.

As illustrated in FIG. 8, the first sliding section 33 slides in the negative Z axial direction and the negative X axial direction relative to the main body section 3a while stretching the first spring 7. The first component 4 slides between the outer surface of the covering section 322 and the inner surface of the back plate 311 and further passes through the cutout 317. As a result, the gripping of the one corner of the upper end of the first component 4 is released.

At the same time, the second sliding section 133 slides in the negative Z axial direction and the positive X axial direction relative to the main body section 3a while stretching the second spring 8. As a result, the gripping of the other corner of the upper end of the first component 4 is released. The first component 4 is left fitted to the second component 5.

In a fifth process, the robot 1 moves the gripping mechanism 3 in the negative Z axial direction and returns the gripping mechanism 3 to the original position thereof in preparation for the next operation. The first sliding section 33 returns to the original position thereof illustrated in FIG. 2 relative to the main body section 3a due to restoring force of the first spring 7. The second sliding section 133 returns to the original position thereof illustrated in FIG. 2 relative to the main body section 3a due to restoring force of the second spring 8.

According to the embodiment, the gripping mechanism 3 requires no motive power and includes only the first holder 31, the first gripping roller 32, the second holder 131, and the second gripping roller 132. As a result, the gripping mechanism 3 can be realized at low cost and is difficult to damage. Furthermore, even in a case where the horizontal width of the first component 4 is large, both corners of the first component 4 are securely gripped by the gripping mechanism 3. Moreover, the gripping of the first component 4 is easily released because the first gripping section 3b and the second gripping section 3c slide left and right due to the robot 1 pushing the gripping mechanism 3 toward the first component 4.

Note that the strength of the first spring 7 and the second spring 8 is appropriately set such that the robot 1 can easily stretch the first spring 7 and the second spring 8 when pushing the gripping mechanism 3 in the fourth process.

The description of the above embodiment is of an ideal embodiment of the present disclosure, and therefore includes various favorable technical limitations. However, the technical scope of the present disclosure is not limited to the embodiment unless specifically described as such. That is, elements of configuration in the above embodiment may be appropriately replaced with existing elements of configuration and the like, and a number of variations including other existing elements of configuration are possible. The description of the above embodiment does not limit the content of the disclosure described in the claims.

What is claimed is:

1. A gripping mechanism which grips an object, the gripping mechanism comprising:
    a main body section;
    a first gripping section connected to the main body section; and
    a second gripping section connected to the main body section, wherein the first gripping section and the second gripping section have a space therebetween,
    the first gripping section includes:
        a first roller;
        a first frame which houses the first roller;
        a first sliding section fixed to the first frame; and
        a first elastic member which connects the first sliding section to the main body section,
    the first gripping section grips a first portion of the object between an outer surface of the first roller and an inner surface of the first frame using gravity acting on the first roller,
    the first sliding section slides relative to the main body section in a direction in which gripping of the first portion of the object is released,
    the second gripping section includes:
        a second roller;
        a second frame which houses the second roller;
        a second sliding section fixed to the second frame; and
        a second elastic member which connects the second sliding section to the main body section,
    the second gripping section grips a second portion of the object between an outer surface of the second roller and an inner surface of the second frame using gravity acting on the second roller, the second portion differing from the first portion, and
    the second sliding section slides relative to the main body section in a direction in which gripping of the second portion of the object is released.

2. The gripping mechanism according to claim 1, wherein the first roller and the second roller each include:
    a cylindrical core; and
    a covering section which covers a peripheral surface of the core with an elastic object.

3. The gripping mechanism according to claim 2, wherein a friction coefficient of a peripheral surface of the covering section is greater than a friction coefficient of the peripheral surface of the core.

4. The gripping mechanism according to claim 1, wherein the first frame and the second frame each include two plate sections which support respective weights of the first roller and the second roller, the two plate sections have an opening therebetween which receives insertion of the object, and one of the two plate sections is slanted relative to a vertical direction.

5. An assembly apparatus comprising:

the gripping mechanism according to claim 1; and a driving mechanism configured to move the gripping mechanism relative to the object.

* * * * *